United States Patent [19]
Hayasaka

[11] Patent Number: 5,892,311
[45] Date of Patent: Apr. 6, 1999

[54] INDUCTION GENERATOR HAVING A PAIR OF MAGNETIC POLES OF THE SAME POLARITY OPPOSED TO EACH OTHER WITH RESPECT TO A ROTATION SHAFT

[75] Inventor: Shigeaki Hayasaka, Sakai, Japan

[73] Assignee: Yazaki S.R.M. Co., Ltd., Tokyo, Japan; a part interest

[21] Appl. No.: 750,695

[22] PCT Filed: Apr. 19, 1995

[86] PCT No.: PCT/JP95/00769

§ 371 Date: Dec. 18, 1996

§ 102(e) Date: Dec. 18, 1996

[87] PCT Pub. No.: WO96/33546

PCT Pub. Date: Oct. 24, 1996

[51] Int. Cl.$^6$ .................................................. H02K 21/12
[52] U.S. Cl. ...................... 310/166; 310/156; 310/152; 310/158
[58] Field of Search ..................... 310/144, 178, 310/198, 156, 152, 158

[56] References Cited

U.S. PATENT DOCUMENTS

| | | | |
|---|---|---|---|
| 282,472 | 1/1883 | Delaporte | 318/197 |
| 2,982,872 | 5/1961 | Fredrickson | 310/163 |
| 3,858,308 | 1/1975 | Peterson | 29/598 |
| 4,780,635 | 10/1988 | Neumann | 310/216 |
| 5,030,867 | 7/1991 | Yamada et al. | 310/156 |
| 5,111,095 | 5/1992 | Hendershot | 310/168 |
| 5,402,025 | 3/1995 | Saito et al. | 310/156 |

FOREIGN PATENT DOCUMENTS

| | | |
|---|---|---|
| 2-184244 | 7/1990 | Japan . |
| 0 411 563 | 2/1991 | Japan ............... H02K 21/20 |
| 3-80677 U | 8/1991 | Japan . |
| 3-212145 | 9/1991 | Japan . |

OTHER PUBLICATIONS

Publication "Novel Reluctance Machine Concepts for Variable Speed Drives", Lipo, T.A., Proceedings from the Mediterranean Electrochemical Conference, Ljubljana, May 22–24, 1991, pp. 34–43.

*Primary Examiner*—Clayton LaBalle
*Assistant Examiner*—Timothy A. Williams
*Attorney, Agent, or Firm*—Michael N. Meller

[57] ABSTRACT

An induction generator having a pair of magnetic poles of the same polarity opposed to each other with respect to a rotation shaft is characterized by a high energy conversion efficiency. The induction generation has a rotation shaft driven by an external means; an even number of (more than three) stator cores provided to encircle the rotation shaft, predetermined gaps being provided between the adjacent stator cores; a first monopole rotor provided in the rotation shaft, surrounded by the even number of stator cores, and having first and second magnetic poles of the same polarity, the first and second magnetic poles being opposed to each other with respect to the rotation shaft in a cross section; a second monopole rotor provided in the rotation shaft so as to face the first monopole rotor at a predetermined distance along the rotation shaft, surrounded by the even number of stator cores, and having third and fourth magnetic poles of the same polarity opposite to the polarity of the first and second magnetic poles, the third and fourth magnetic poles being opposite to each other with respect to the rotation shaft; a plurality of windings provided in the even number of stator cores and connected according to a predetermined configuration.

15 Claims, 9 Drawing Sheets

INDUCTION GENERATOR HAVING A PAIR OF MAGNETIC POLES OF THE SAME POLARITY OPPOSED TO EACH OTHER WITH RESPECT TO A ROTATION SHAFT

TECHNICAL FIELD

The present invention relates to an induction generator having a pair of magnetic poles of the same polarity opposed to each other with respect to a rotation shaft.

Induction generators have been known as one type of electrical appliance from relatively old days and embodied in various forms adapted for individual applications. In addition to applications in power plants, ships and aircraft, induction generators convenient for household or leisure purposes have also been developed and extensively used.

An induction generator converts kinetic energy into electric energy. Due to a necessity for improving efficiency of energy utilization, there is a demand for a highly efficient energy conversion.

BACKGROUND ART

As is well known, an induction generator is operated on the principle that an electromotive force in proportion to a rate at which the magnetic flux crosses a coil decreases is induced in a coil (Faraday's law of electromagnetic induction). According to Lenz's law, an induced electromotive force is generated in a direction in which a current that acts against a change in the magnetic flux is generated.

Figure 1A:
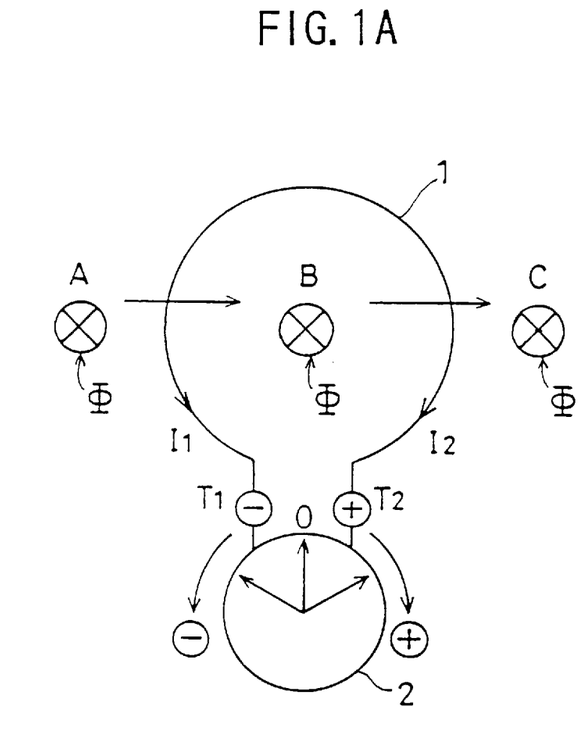
FIGS. 1A and 1B are diagrams explaining the principle of an induction generator.
Figure 1B:
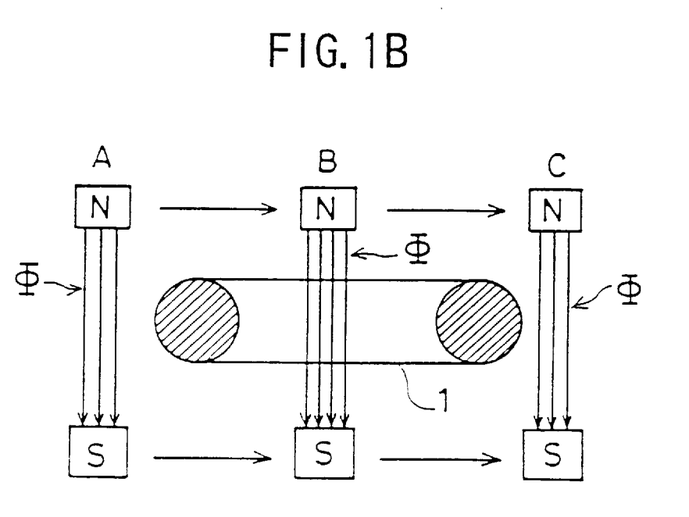

For example, as shown in FIGS. 1A and 1B, assuming that the magnetic flux $\phi$ crossing a circular coil 1 at a perpendicular direction moves in the A→B direction as indicated by the arrow, a current $I_1$ flows in accordance with Faraday's law of electromagnetic induction so that the pointer of a galvanometer 2 swings clockwise (+ direction) and then returns to the zero position. When the magnetic flux $\phi$ moves in the B→C direction, a current $I_2$ flows so that the indicator of the galvanometer 2 swings counterclockwise (− direction) and then returns to the zero position.

Generally, an induction generator is constructed such that an electromotive force is induced according to Flemming's right-hand rule by a conductor cutting magnetic flux lines (FIG. 1A) or by the magnetic flux lines crossing the conductor (FIG. 1B).

A rotor in an induction generator is usually embodied by a one-piece body having alternately disposed N-poles and S-poles. When there are two magnetic poles, the N-pole and the S-pole are opposite to each other. When there are more than two magnetic poles (for example, four magnetic poles or six magnetic poles etc.), the N-pole and the S-pole alternate, resulting in a N-S-N-S- . . . succession.

In this background, a unipolar induction generator is a special case wherein an electromotive force is generated by a conductor cutting the magnetic flux while moving or rotating, and a direct current is supplied through a slip ring. In other words, a unipolar induction motor is unique in its construction characterized by a non-alternating magnetic field traveling in the same direction.

In the conventional induction generator such as the one described above, improvement in energy conversion efficiency is attained such that the rotor is constructed of a ferrite or rare-earth magnet characterized by a high energy product and a small reversing permeability (recoil permeability). Alternatively, the extent of demagnetization due to generation of a counter magnetic field in an induction coil is reduced allowing the single polarity of the rotor to interact with the stator in forming a magnetic circuit. However, despite these measures, reduction in energy conversion efficiency due to a counter magnetic field of the rotor core, more specifically, due to demagnetization resulting from the counter magnetic field caused by armature reaction presents a serious problem.

The present invention has been developed in view of the above points, and its object is to provide an induction generator having a pair of magnetic poles of the same polarity opposed to each other with respect to a rotation shaft, wherein a high energy conversion efficiency is attained.

DISCLOSURE OF THE INVENTION

The present invention provides an induction generator having a pair of magnetic poles of the same polarity opposed to each other with respect to a rotation shaft, characterized by comprising:

a rotation shaft driven by external means;

an even number of (more than three) stator cores provided to encircle the rotation shaft, predetermined gaps being provided between the adjacent stator cores;

a first single-opposed polarity rotor provided in the rotation shaft, surrounded by the even number of stator cores, and having first and second magnets magnetized such that the even number of stator cores remain facing a first polarity, the first and second magnets being opposed to each other with respect to the rotation shaft in a cross section;

a second single-opposed-polarity rotor provided in the rotation shaft so as to face the first single-opposed-polarity rotor at a predetermined distance along the rotation shaft, surrounded by the even number of stator cores, and having third and fourth magnets magnetized such that the even number of stator cores remain facing a second polarity which is opposite to the polarity of the first polarity, the third and fourth magnets being disposed opposite to each other with respect to the rotation shaft;

a plurality of windings provided in the even number of stator cores and connected according to a predetermined configuration, characterized in that:

a rotating magnetic field which causes electromagnetic induction in the even number of stator cores successively is created by the first, second, third and fourth magnets when the first and second single-opposed-polarity rotors are rotated; and periodic increase and decrease in the number of magnetic flux lines crossing a given winding and associated periodic decrease and increase crossing an adjacent winding causes a periodic electromotive force having a rectangular waveform to be output.

In one aspect of the present invention, the plurality of windings connected according to the predetermined configuration form first and second serial circuits;

the first serial circuit outputs a periodic first electromotive force having a rectangular waveform when a rotating magnetic field which causes electromagnetic induction in the even number of stator cores successively is created by the first, second, third and fourth magnets when the first and second single-opposed-polarity rotors are rotated; and the second serial circuit outputs a periodic second electromotive force of a rectangular waveform 180° out of phase with the first electromotive force and having the same period as the first electromotive force, when a rotating magnetic field which causes electromagnetic induction in the even number of stator cores successively is created by the first and second single-opposed-polarity rotors are rotated.

The induction generator of the present invention may also comprise:

rotation position detecting means for detecting a position of the first and second single-opposed-polarity rotors during their rotation; and switching means which alternately causes positive components of the first electromotive force having a rectangular waveform and provided by the first serial circuit, or positive components of the second electromotive force having a rectangular waveform and provided by the second serial circuit to be output at intervals of an electrical angle of 180°.

In another aspect of the present invention, the plurality of windings comprise a first winding provided in a first stator core of the even number of stator cores, a second winding provided in a second stator core adjacent to the first stator core so as to wind in a direction opposite to a direction in which the first winding is provided, a third winding provided in a third stator core adjacent to the second stator core so as to wind in the same direction as the first winding, a fourth winding provided in a fourth stator core adjacent to the third stator core so as to wind in a direction opposite to a direction in which the third winding is provided, the first through fourth windings being connected with each other according to a predetermined configuration.

In still another aspect of the present invention, the first serial circuit comprises a first winding provided to wind in a first direction in a first stator core of the even number of stator cores, a second winding serially connected to the first winding and provided in a second stator core adjacent to the first stator core so as to wind in a second direction opposite to the first direction, a third winding serially connected with the second winding and provided in a third stator core adjacent to the second stator core so as to wind in the first direction, a fourth winding serially connected to the third winding and provided in a fourth stator core adjacent to the third stator core so as to wind in the second direction; and the second serial circuit comprises a fifth winding provided to wind in the second direction in the first stator core, a sixth winding serially connected to the fifth winding and provided in the second stator core so as to wind in the first direction, a seventh winding serially connected with the sixth winding and provided in the third stator core so as to wind in the second direction, an eighth winding serially connected to the seventh winding and provided in the fourth stator core so as to wind in the first direction.

In yet another aspect of the present invention, the first through fourth magnets are arc-shaped; and the even number of stator cores have arc-shaped cross sections.

In still another aspect of the present invention, the arc-shaped first through fourth magnets and the stator cores which have arc-like cross sections have an almost identical circumferential length.

BEST MODE FOR CARRYING OUT THE INVENTION

Figure 2A:
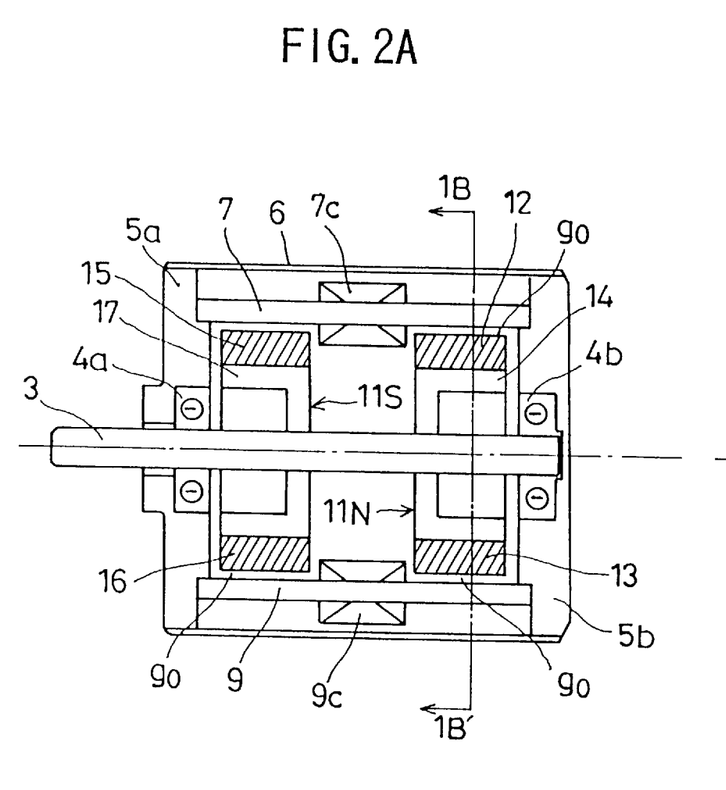
FIGS. 2A and 2B are diagrams showing a first embodiment of the present invention.
Figure 2B:
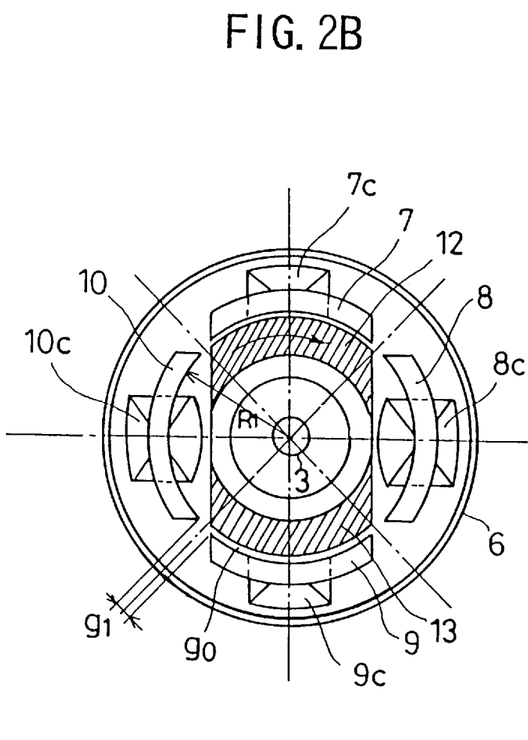

FIGS. 2A and 2B show a first embodiment of the present invention. Specifically, FIG. 2A is a longitudinal sectional view and FIG. 2B is a cross-sectional view taken in the line 1B-1B' of FIG. 2A.

Referring to FIGS. 2A and 2B, 3 indicates a rotation shaft formed of a non-magnetic material and driven by an external means; 4a and 4b bearings for bearing the rotation shaft 3; 5a and 5b flanges provided with the bearings 4a and 4b, respectively; and 6 a cylindrical case cover for accommodating the flanges 5a and 5b.

Stator cores 7, 8, 9 and 10 are arranged so as to encircle the rotation shaft 3, equidistant gaps $g_1$ being provided between the adjacent stator cores. Each of the stator cores 7, 8, 9 and 10 has a same arc-like cross section.

A single-opposed-polarity N-pole rotor 11N and a single-opposed-polarity S-pole rotor 11S are provided on the rotation shaft 3 so as to be opposite to each other. The single-opposed-polarity rotors 11N and 11S are surrounded by the stator cores 7, 8, 9 and 10, a small rotation gap $g_0$ being provided between the single-opposed-polarity rotor and the stator core.

Referring to FIG. 2B, windings 7c and 9c are provided clockwise around the stator cores 7 and 9, respectively. Windings 8c and 10c are wound counterclockwise around the stator cores 8 and 10, respectively. The windings 7c, 8c, 9c and 10c are connected with each other according to a configuration described later.

Figures 3A, 3B:
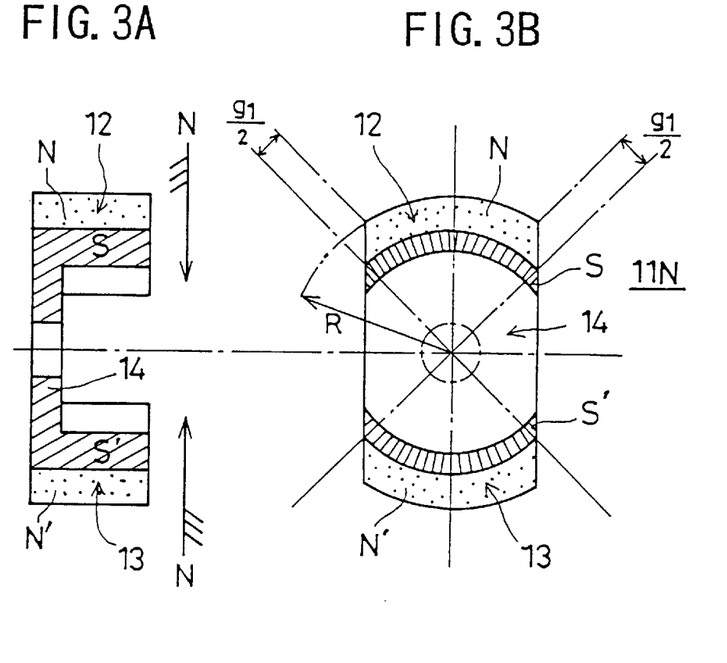
FIGS. 3A and 3B are diagrams showing a single-opposed-polarity rotor 11N according to the first embodiment of the present invention.

FIGS. 3A and 3B show the single-opposed-polarity rotor 11N. Specifically, FIG. 3A is a longitudinal sectional view, and FIG. 3B is a cross-sectional view.

The single-opposed-polarity rotor 11N has arc-shaped magnets 12 and 13 which are 180° displaced from each other and are magnetized such that the surfaces thereof facing the stator cores 7–10 are N-poles and the respective inner surfaces thereof are S-poles. The arc-shaped magnets 12 and 13 are configured to match the outline of the stator cores 7, 8, 9 and 10. Referring to FIG. 3B, the symbols N and N' are used so as to differentiate between the magnets 12 and 13.

A rotor piece 14 is disposed to connect the arc-shaped magnets 12 and 13. The rotor piece 14 is magnetized by the arc-shaped magnets 12 and 13 such that the surfaces thereof facing the arc-shaped magnets 12 and 13 are S-poles and is formed of a substance (for example, a silicon steel) constructed of a low carbon steel having mixed therein several percent of non-ferrous metal subjected to a forging-cast process. The iron core embodied by the rotor piece 14 thus constructed is characterized by a well-balanced magnetic field where the permeability approximates a peak value in a unipolar magnetic field that the iron core presents to its surroundings.

Figures 4A, 4B:
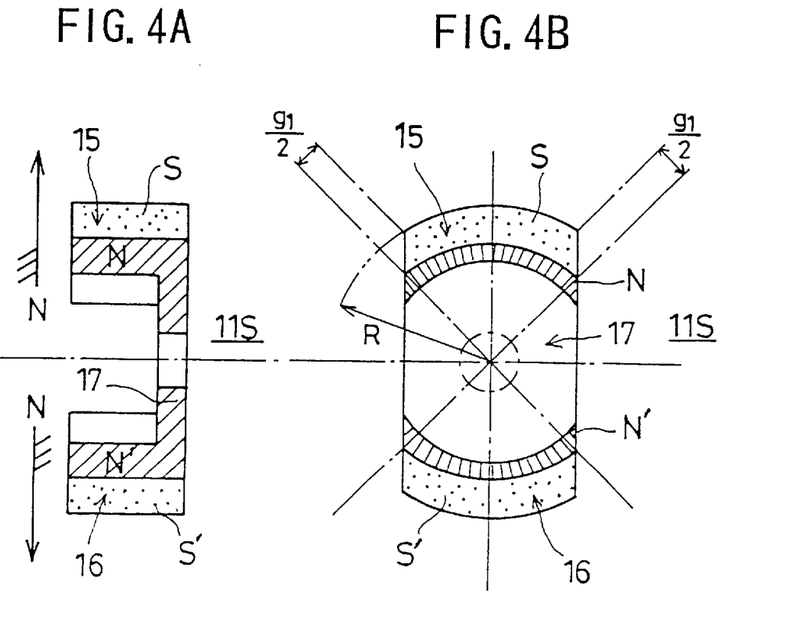
FIGS. 4A and 4B are diagrams showing a single-opposed-polarity rotor 11S according to the first embodiment of the present invention.

FIGS. 4A and 4B show the single-opposed-polarity rotor 11S. Specifically, FIG. 4A is a longitudinal sectional view, and FIG. 4B is a cross-sectional view.

The single-opposed-polarity rotor 11S has arc-shaped magnets 15 and 16 which are 180° displaced from each other and are magnetized such that the surfaces thereof facing the stator cores 7–10 are S-poles and the respective inner surfaces thereof are N-poles. The arc-shaped magnets 15 and 16 are configured to match the outline of the stator cores 7, 8, 9 and 10.

A rotor piece 17 is disposed to connect the arc-shaped magnets 15 and 16. The rotor piece 17 is magnetized by the arc-shaped magnets 15 and 16 such that the surfaces thereof facing the arc-shaped magnets 15 and 16 are N-poles and is formed of a substance constructed of a low carbon steel having mixed therein several percent of non-ferrous metal subjected to a forging-cast process. The iron core embodied by the rotor piece 17 thus constructed is characterized by a well-balanced magnetic field where the permeability approximates a peak value in a unipolar magnetic field that the iron core presents to its surroundings.

The arc-shaped magnets 12, 13, 15 and 16 have the same circumferential length, which length is also equal to the length of the arc formed by the circumference of the stator cores 7, 8, 9 and 10. More specifically, this length is obtained by dividing by four the entire hypothetical circumference minus the gaps $4g_1$. Referring to FIGS. 2A and 2B, the rotation gap $g_0$ is equal to $R_1-R$, where $R_1$ is a distance between the center of the rotation shaft 3 and the inner surface of the stator cores 7–10, and R is a distance between the center of the rotation shaft 3 and the outer surface of the single-opposed-polarity rotors 11N and 11S, as indicated in FIGS. 3B and 4B.

Figure 5A:
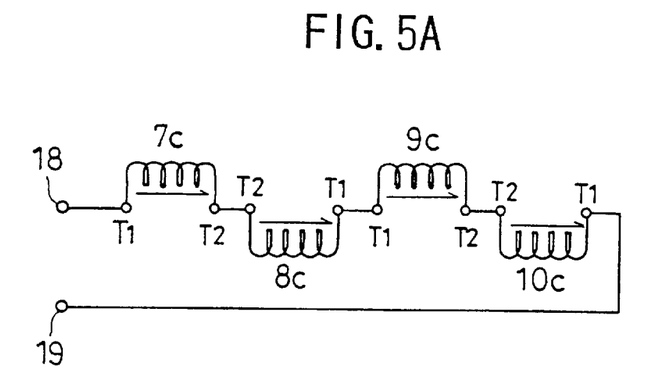
FIGS. 5A, 5B and 5C are diagrams showing how wirings are connected with each other according to the first embodiment of the present invention.
Figure 5B:
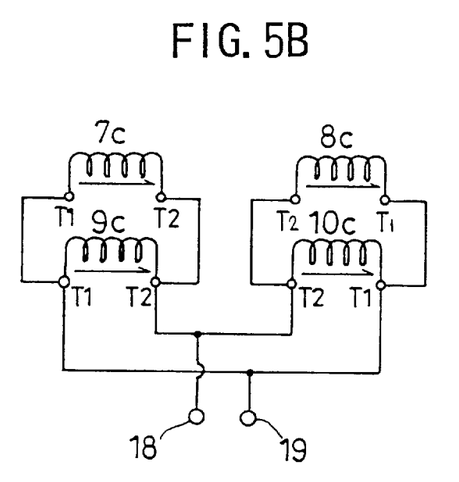
Figure 5C:
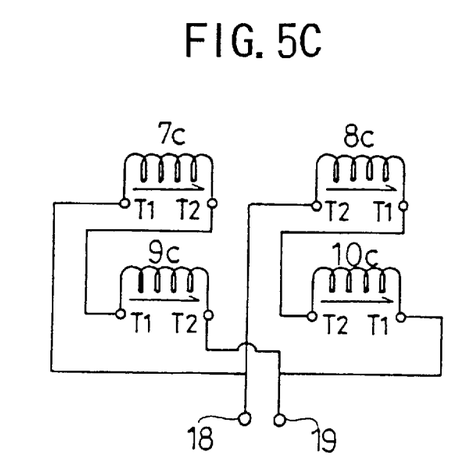

FIGS. 5A–5C show how the wirings are connected with each other. $T_1$ indicates the beginning of a winding, $T_2$ the end of a winding, and 18 and 19 output terminals. More specifically, FIG. 5A shows a serial connection configuration, FIG. 5B a serial-parallel connection configuration, and FIG. 5C a parallel connection configuration. The serial connection configuration allows the electromotive force induced in the windings to be added together and provides a high-voltage output. The parallel connection configuration allows currents resulting from the electromotive force iduced in the windings to be added together and provides a large-current output.

A description will now be given, with reference to FIGS. 6A, 6B and 7, of power generation operation of the serial connection configuration.

Figure 6A:
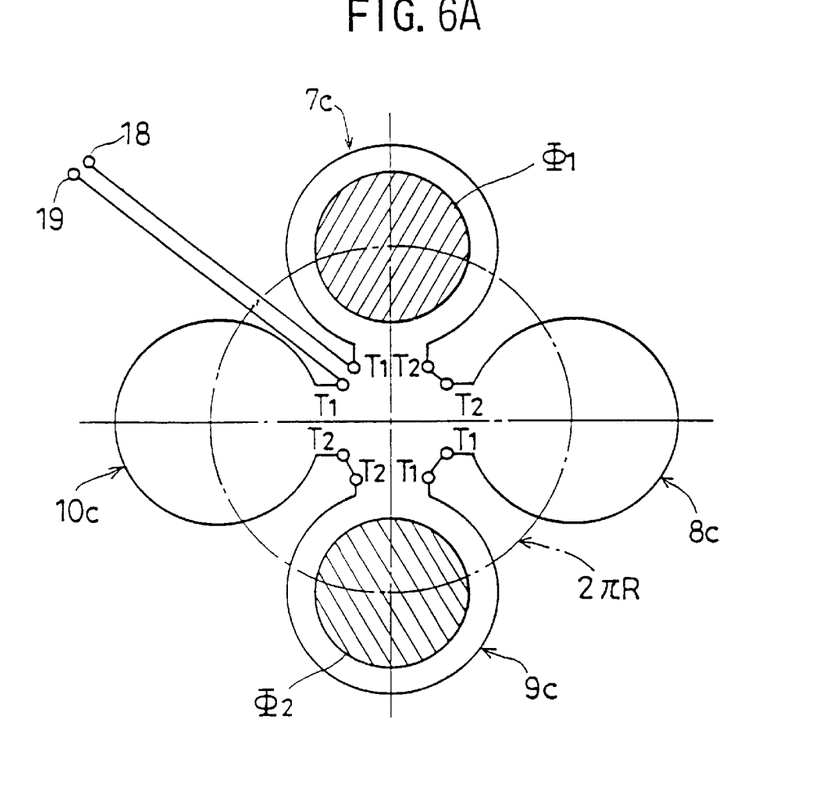
FIG. 6A is a diagram schematically showing how a rotating magnetic field according to the first embodiment crosses windings 7c–10c.

FIG. 6A is a diagram schematically showing how the rotating magnetic field provided by the single-opposed-polarity rotors 11S and 11N crosses windings 7c–10c. FIG. 6B shows a magnetic path.

Referring to FIG. 6A, $\phi_1$ and $\phi_2$ indicates rotating magnetic flux rotating along the circumference $2\pi R$. FIG. 6B shows the arc-shaped magnets 12 and 15 directly opposite the stator core 7 over their entire length, and the arc-shaped magnets 13 and 16 directly opposite the stator core 9 over their entire length.

Figure 6B:
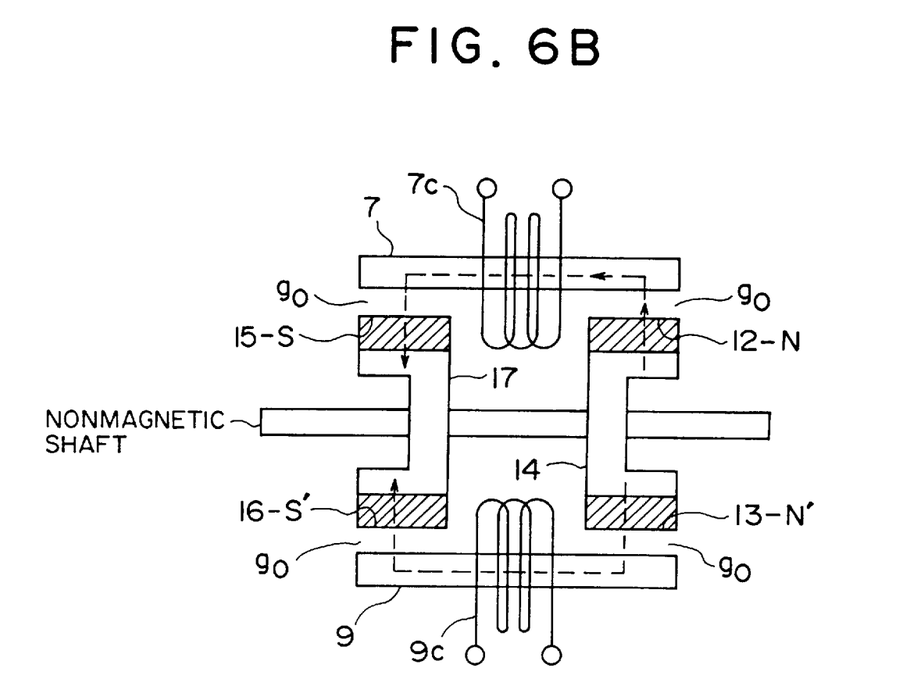
FIG. 6B shows a magnetic path.

As shown in FIG. 6B, the magnetic flux $\phi_1$ forms a magnetic path as follows:

the rotor piece 14 (S) - the arc-shaped magnet pole 12 (N) - stator core 7 - the rotation gap $g_0$ - the arc-shaped magnet 15 (S) - the rotor piece 17 (N).

The magnetic flux $\phi_2$ forms a magnetic path as follows:

the rotor piece 14 (S) - the arc-shaped magnet 13 (N) - the rotation gap $g_0$ - the stator core 9 - the rotation gap $g_0$ - the arc-shaped magnet 16 (S) - the rotor piece 17 (N).

Thus, a parallel magnetic path is formed. In this state, the magnetic flux $\phi_1$ crosses the winding 7c, and the magnetic flux $\phi_2$ crosses the winding 9c.

A description focused on the rotation of the magnetic flux $\phi_1$ is given. Specifically, a description will be given of a change in the way the magnetic flux $\phi_1$ crosses the windings.

Figure 7:
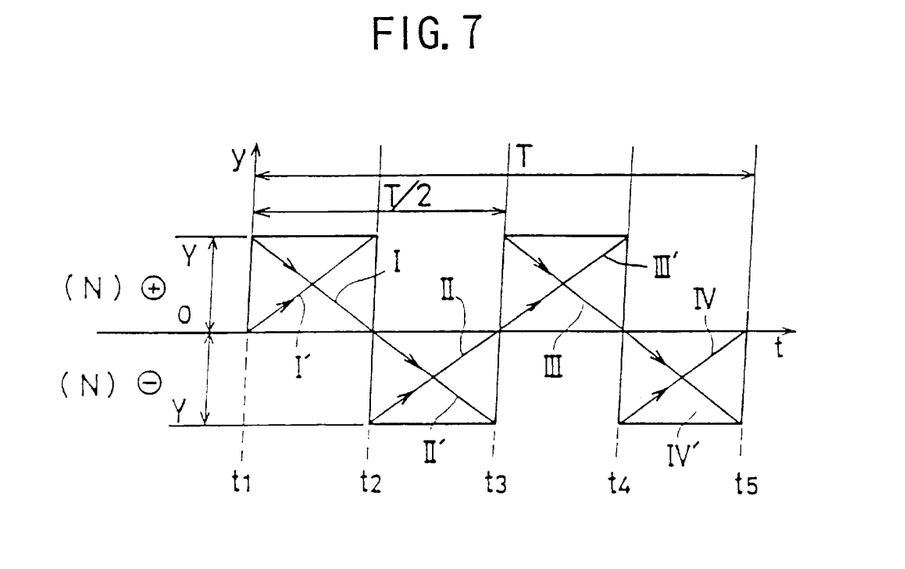
FIG. 7 is a diagram showing a waveform of an output voltage according to the first embodiment.

Referring to a waveform of an output voltage shown in FIG. 7, the entirety of the magnetic flux $\phi_1$ crosses the winding 10c at a time $t_1$. At a time $t_2$, the entirety of the magnetic flux $\phi_1$ crosses the winding 7c. At a time $t_3$, the entirety of the magnetic flux $\phi_1$ crosses the winding 8c. At a time $t_4$, the entirety of the magnetic flux $\phi_1$ crosses the winding 9c. At a time $t_5$, the entirety of the magnetic flux $\phi_1$ crosses the winding 10c. In this way, the magnetic flux $\phi_1$ rotates at a constant speed during a time T, in a clockwise direction in FIG. 6A.

Between the time $t_1$ and the time $t_2$, an electromotive force having a descending triangular waveform, indicated by I in FIG. 7, is generated in the winding 10c due to a decrease in the number of magnetic flux lines of the magnetic flux $\phi$ crossing the winding 10c. An electromotive force having an ascending triangular waveform, indicated by I' in FIG. 6, is generated in the winding 7c due to an increase in the number of magnetic flux lines of the magnetic flux $\phi$ crossing the winding 7c. Accordingly, a positive rectangular waveform obtained by the sum of these triangular waveforms is output to the output terminals 18 and 19.

Between the time $t_2$ and the time $t_3$, an electromotive force having an ascending triangular waveform, indicated by II in FIG. 7, is generated in the winding 7c due to a decrease in the number of magnetic flux lines of the magnetic flux $\phi$ crossing the winding 7c. An electromotive force having a descending triangular waveform, indicated by II' in FIG. 7, is generated in the winding 8c due to an increase in the number of magnetic flux lines of the magnetic flux $\phi$ crossing the winding 8c. Accordingly, a negative rectangular waveform obtained by the sum of these triangular waveforms is output to the output terminals 18 and 19.

Between the time $t_3$ and the time $t_4$, an electromotive force having a descending triangular waveform, indicated by III in FIG. 7, is generated in the winding 8c due to a decrease in the number of magnetic flux lines of the magnetic flux $\phi$ of the magnetic flux $\phi$ crossing the winding 8c. An electromotive force having an ascending triangular waveform, indicated by III' in FIG. 7, is generated in the winding 9c due to an increase in the number of magnetic flux lines of the magnetic flux $\phi$ crossing the winding 9c. Accordingly, a positive rectangular waveform obtained by the sum of these triangular waveforms is output to the output terminals 18 and 19.

Between the time $t_4$ and the time $t_5$, an electromotive force having an ascending triangular waveform, indicated by IV in FIG. 7, is generated in the winding 9c due to a decrease in the number of magnetic flux lines of the magnetic flux $\phi$ of the magnetic flux $\phi$ crossing the winding 9c. An electromotive force having a descending triangular waveform, indicated by IV' in FIG. 7, is generated in the winding 10c due to an increase in the number of magnetic flux lines of the magnetic flux $\phi$ crossing the winding 10c. Accordingly, a negative rectangular waveform obtained by the sum of these triangular waveforms is output to the output terminals 18 and 19.

While the magnetic flux $\phi_1$ makes one rotation, an electromotive force having a synthesized rectangular waveform and a period of T/2 is output, as shown in FIG. 7. Since the magnetic flux $\phi_2$ also makes one rotation while the magnetic flux $\phi_1$ makes one rotation and produces an output of an electromotive force having a similar rectangular waveform, the magnitude of the electromotive force obtained between the terminals 18 and 19 is actually double that indicated in FIG. 7.

In this way, this embodiment makes it possible to cancel a counter magnetic field and provide an induction generator having a pair of magnetic poles of the same polarity opposed to each other with respect to a rotation shaft and characterized by a high energy conversion efficiency. Our operating practice has confirmed that the generator having the construction of this embodiment provides an energy conversion efficiency which is high enough to require only $\frac{1}{5.2}$ of the driving torque for the conventional generator.

Figure 8A:
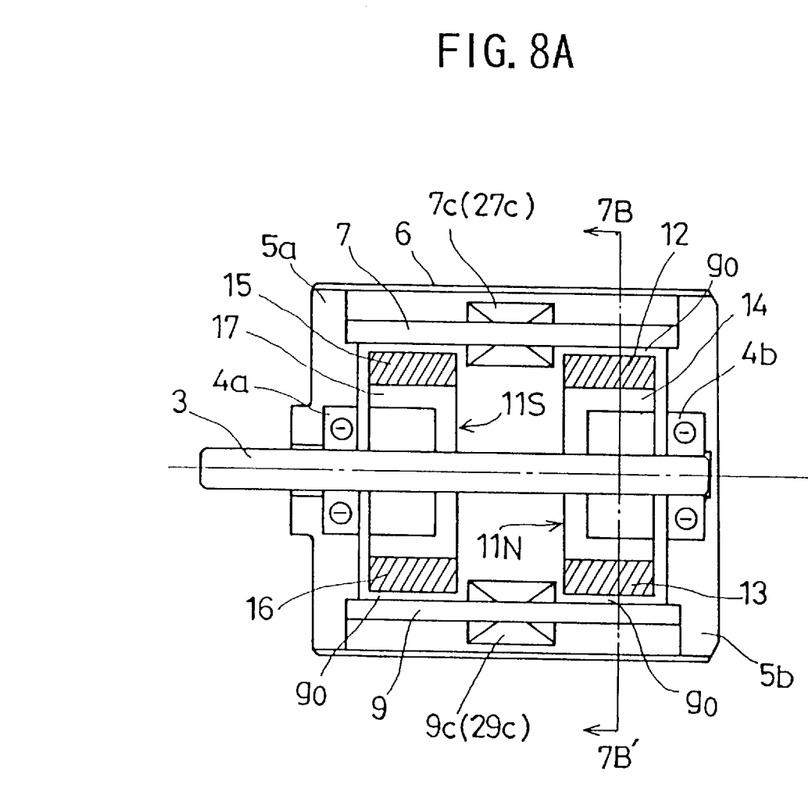
FIGS. 8A and 8B are diagrams showing a second embodiment of the present invention.

FIGS. 8A and 9A show a second embodiment of the present invention. Specifically, FIG. 8A is a longitudinal sectional view, and FIG. 8B is a cross-sectional view taken in the line 7B-7B' of FIG. 8A.

Figure 8B:
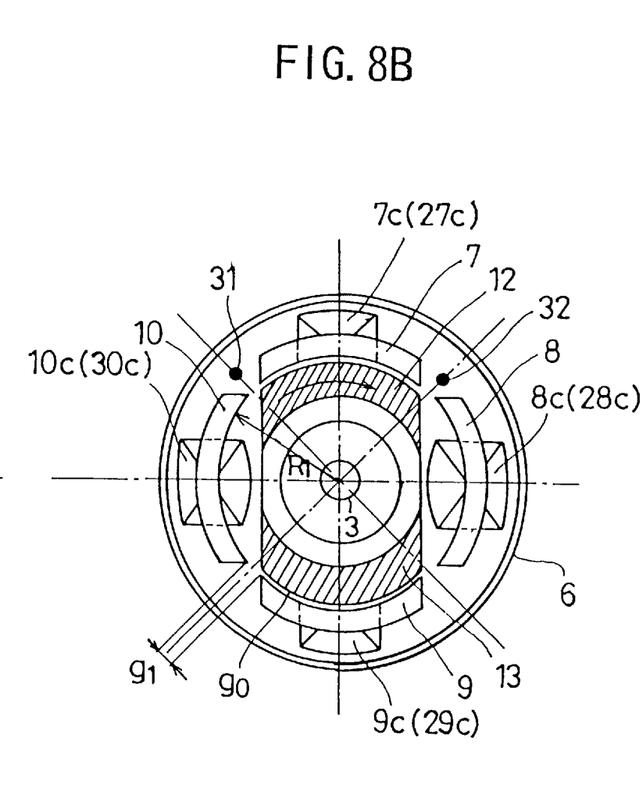

Referring to FIGS. 8A and 8B, 3 indicates a rotation shaft formed of a non-magnetic material and driven by an external means; 4a and 4b bearings for bearing the rotation shaft 3; 5a and 5b flanges provided with the bearings 4a and 4b, respectively; and 6 a cylinderical case cover for accommodating the flanges 5a and 5b.

Stator cores 7, 8, 9 and 10 are arranged so as to encircle the rotation shaft 3, equidistant gaps $g_1$ being provided between the adjacent stator cores. Each of the stator cores 7, 8, 9 and 10 has a same arc-like cross section.

A single-opposed-polarity N-pole rotor 11N and a single-opposed-polarity S-pole rotor 11S are provided on the rotation shaft 3 so as to be opposite to each other. The single-opposed-polarity rotors 11N and 11S are surrounded by the stator cores 7, 8, 9 and 10, a small rotation gap $g_0$ being provided between the single-opposed-polarity rotor and the stator core.

Referring to FIG. 8B, windings 7c and 9c are provided clockwise around the stator cores 7 and 9, respectively. Windings 27c and 29c are provided counterclockwise around the stator cores 7 and 9, respectively. Windings 8c and 10c are provided counterclockwise in the stator cores 8 and 10, respectively. Windings 28c and 30c are wound clockwise around the stator cores 8 and 10, respectively. The windings 7c, 8c, 9c, 10c, 27c, 28c, 29c and 30c are connected with each other according to a configuration described later.

A magnetic sensor (rotation position detecting means) 31 is provided between the stator cores 7 and 10, and a magnetic sensor (rotation position detecting means) 32 is provided between the stator cores 7 and 8. The magnetic sensors 31 and 32 detect the magnetic field so as to detect the position of the single-opposed-polarity rotors 11N and 11S during their rotation.

The single-opposed-polarity rotors 11N has a configuration as shown in FIGS. 3A and 3B, and the monopole rotor 11S has a configuration as shown in FIGS. 4A and 4B.

The single-opposed-polarity rotor 11N has arc-shaped magnets 12 and 13 which are 180° displaced from each other and are magnetized such that the surfaces thereof facing the stator cores are N-poles and the respective inner surfaces thereof are S-poles. The arc-shaped magnets 12 and 13 are configured to match the outline of the stator cores 7, 8, 9 and 10.

A rotor piece 14 is disposed to connect the arc-shaped magnets 12 and 13. The rotor piece 14 is formed of a substance constructed of a low carbon steel having mixed therein several percent of non-ferrous metal subjected to a forging-cast process. The iron core embodied by the rotor piece 14 thus constructed is characterized by a well-balanced magnetic field where the permeability approximates a peak value in a unipolar magnetic field that the iron core presents to its surroundings.

The single-opposed-polarity rotor 11S has arc-shaped magnets 15 and 16 which are 180° displaced from each other and are magnetized such that the surfaces thereof facing the stator cores are S-poles and the respective inner surfaces thereof are N-poles. The arc-shaped magnets 15 and 16 are configured to match the outline of the stator cores 7, 8, 9 and 10.

A rotor piece 17 is disposed to connect the arc-shaped magnets 15 and 16. The rotor piece 17 is formed of a substance constructed of a low carbon steel having mixed therein several percent of non-ferrous metal subjected to a forging-cast process. The iron core embodied by the rotor piece 17 thus constructed is characterized by a well-balanced magnetic field where the permeability approximates a peak value in a unipolar magnetic field that the iron core presents to its surroundings.

The arc-shaped magnets 12, 13, 15 and 16 have the same circumferential lengths, which length is also equal to the length of the arc formed by the circumference of the stator cores 7, 8, 9 and 10. More specifically, this length is obtained by dividing by four the entire hypothetical circumference minus the gaps $4g_1$. Referring to FIGS. 3A, 3B, 4A, 4B and 8, the rotation gap $g_0$ is equal to $R_1-R$.

Figure 9:
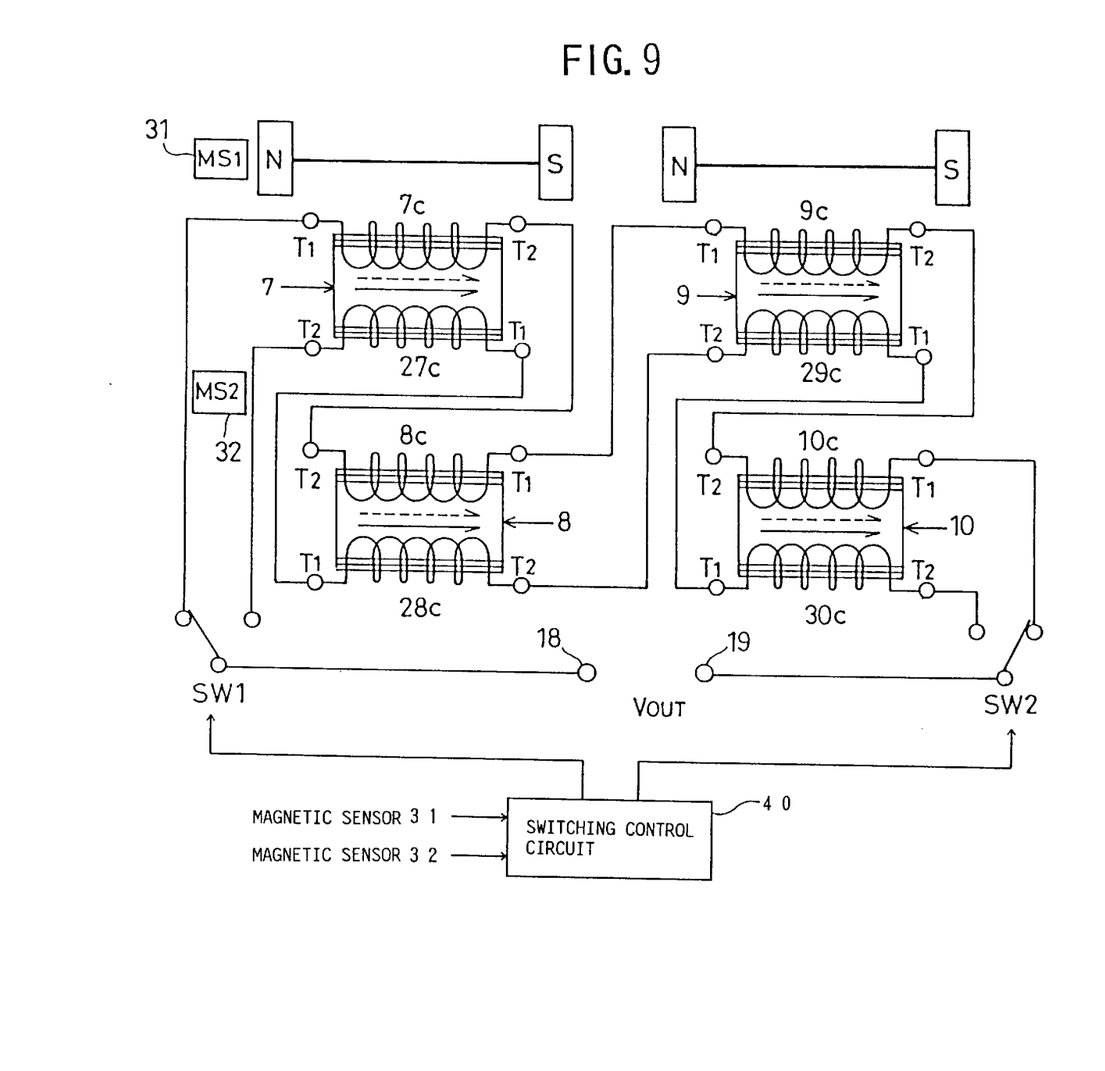
FIG. 9 is a diagram showing how wirings are connected with each other according to a second embodiment.

FIG. 9 shows how the wirings are connected with each other. $T_1$ indicates the beginning of a winding, $T_2$ the end of a winding, and 18 and 19 output terminals.

Two serial circuits are formed out of the windings. Switches SW1 and SW2 are used for selection of the respective serial circuits. A switching control circuit 40, which processes a detection signal from the magnetic sensors 31 and 32, selectively drives the switches SW1 and SW2 in accordance with the detection signal.

As shown in FIG. 9, the first serial circuit comprises the winding 7c provided clockwise in the stator core 7; the winding 8c serially connected with the winding 7c and provided counterclockwise in the stator core 8 adjacent to the stator core 7; the winding 9c serially connected with the winding 8c and provided clockwise in the stator core 9; and the winding 10c serially connected with the winding 9c and provided counterclockwise in the stator core 10 adjacent to the stator core 9.

As shown in FIG. 9, the second serial circuit comprises the winding 27c provided counterclockwise in the stator core 7; the winding 28c serially connected with the winding 27c and provided clockwise in the stator core 8; the winding 29c serially connected with the winding 28c and provided counterclockwise in the stator core 9; and the winding 30c serially connected with the winding 29c and provided clockwise in the stator core 10.

According to the construction described above, a rotating magnetic field which causes electromagnetic induction in the stator cores 7–10 successively is created by the arc-shaped magnets 12, 13, 15 and 16 when the single-opposed-polarity rotors 11N and 11S are rotated. As has been already explained with reference to FIGS. 6A, 6B and 7, as the magnetic flux lines crossing one of the windings 7c–10c increase in number, the magnetic flux lines crossing the adjacent one of the windings 7c–10c decrease in number. That is, the magnetic flux lines periodically increase and decrease with respect to a given winding so that a first electromotive force, having a rectangular waveform similar to the one shown in FIG. 7 and a period that is ½ the period of the rotation, is output from the first serial circuit (7c–10c).

As the magnetic flux lines crossing one of the windings 27c–30c increase in number, the magnetic flux lines crossing the adjacent one of the windings 27c–30c decrease in number. That is, the magnetic flux lines periodically increase and decrease with respect to a given winding so that a second electromotive force of a rectangular waveform 180° out of phase with the first electromotive force and having the same period as the first electromotive force is output from the second serial circuit (27c–30c). That is, the second electromotive force is 180° out of phase with the electromotive force shown in FIG. 7.

Figure 10:
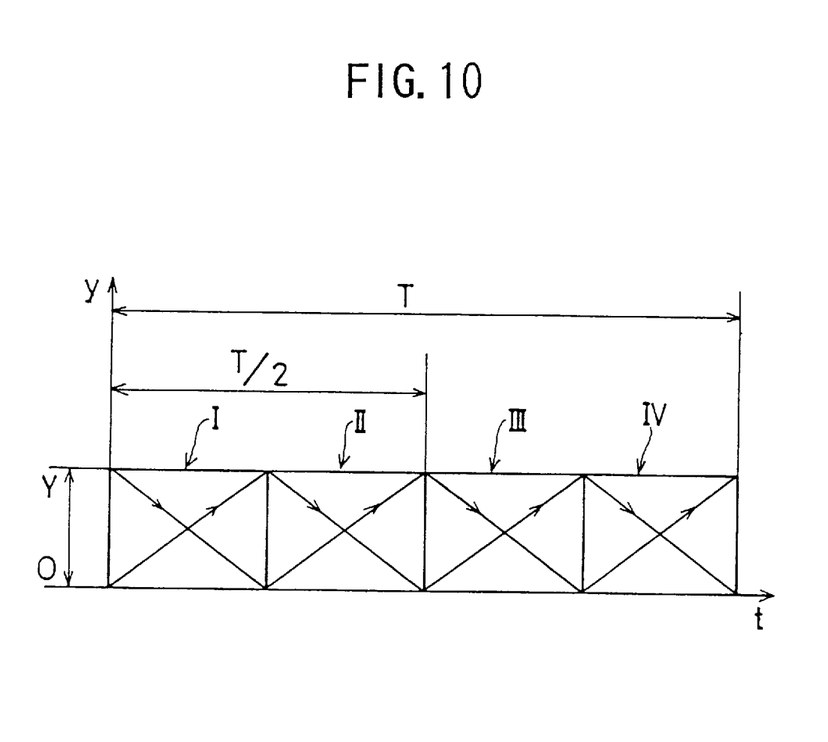
FIG. 10 is a diagram showing a waveform of an output voltage according to the second embodiment.

Referring to FIG. 10, in accordance with the detection signal from the magnetic sensors 31 and 32, the switches SW1 and SW2 effect switching at 90° intervals. Thereby, the positive components I and III of the first electromotive force having a rectangular waveform and provided from the first serial circuit, and the positive components II and IV of the second electromotive force having a rectangular waveform and provided from the second serial circuit are alternately selected at 180° intervals and output to the output terminals 18 and 19.

This means that, this embodiment ensures a high-efficiency energy conversion wherein a counter magnetic field is canceled, and a dc electromotive force having a positive level is properly synthesized and output. It is of course possible to synthesize and output a negative dc electromotive force by shifting the switching timing by 180°.

INDUSTRIAL APPLICABILITY

As has been described, according to the present invention, the rotation of the first and second single-opposed-polarity rotors generates a rotating magnetic field which causes an induction in an even number of stator cores successively. As the magnetic flux lines crossing one of the first through fourth windings increase in number, the magnetic flux lines crossing the adjacent one of the first through fourth windings decrease in number. That is, the mangetic flux lines periodically increase and decrease with respect to a given winding. The electromotive force generated as the magnetic flux lines crossing a winding increase in number and the electromotive force generated as the magnetic flux lines crossing an adjacent winding decrease in number are synthesized so that a periodic ac electromotive force having a rectangular waveform is generated out of the synthesis and output. In this way, a high-efficiency energy conversion wherein a counter magnetic field is canceled is provided.

According to the first serial circuit of the present invention, the rotation of the first and second single-opposed-polarity rotors generates a rotating magnetic field which causes an induction in an even number of stator cores successively. As the magnetic flux lines crossing one of the first through fourth windings increase in number, the magnetic flux lines crossing the adjacent one of the first through fourth windings decrease in number. That is, the magnetic flux lines periodically increase and decrease in a given winding. Accordingly, the first electromotive force having a rectangular waveform is output. According to the second serial circuit, as the magnetic flux lines crossing one of the fifth through eighth windings increase in number, the magnetic flux lines crossing the adjacent one of the fifth through eighth windings decrease in number. That is, the magnetic flux lines periodically increase and decrease in a given winding. Accordingly, the second electromotive force 180° out of phase with the first electromotive force and having the same period as the first electromotive force is output. In accordance with the detection signal from the rotation position detecting means, the switching means selectively causes the positive components of the first electromotive force provided by the first serial circuit, or the positive components of the second electromotive force provided by the second serial circuit to be output at 180° intervals. In this way the dc electromotive force is synthesized and output. In this way, a high-efficiency energy conversion wherein a counter magnetic field is canceled is provided.

In addition to extensive applications in power plants, ships, aircraft etc., the present invention may find household applications or may be conveniently adapted for leisure uses.

I claim:

1. An induction generator having a pair of magnetic poles of the same polarity opposed to each other with respect to a rotation shaft, characterized by comprising:

a rotation shaft driven by external means;

an even number of (more than three) stator cores provided to encircle said rotation shaft, predetermined gaps being provided between the adjacent stator cores;

a first single-opposed-polarity rotor provided on said rotation shaft, surrounded by said even number of stator cores, and having first and second magnets magnetized such that said even number of stator cores remain facing a first polarity, said first and second magnets sandwiching a magnetic body therebetween and being opposed to each other with respect to said rotation shaft in a cross section;

a second single-opposed-polarity rotor provided on said rotation shaft so as to face said first single-opposed-polarity rotor at a predetermined distance along the rotation shaft, surrounded by said even number of stator cores, and having third and fourth magnets magnetized such that said even number of stator cores remain facing a second polarity which is opposite to the polarity of said first polarity, said third and fourth magnets sandwiching a magnetic body therebetween and being disposed opposite to each other with respect to said rotation shaft;

a plurality of windings provided in said even number of stator cores and connected according to a predetermined configuration, characterized in that: a rotating magnetic field which causes electromagnetic induction in said even number of stator cores successively is created by the first, second, third and fourth magnets when said first and second single-opposed-polarity rotors are rotated; and two windings adjacent to each other are wound in opposite directions and connected in series so that a rectangular waveform is formed by synthesizing the electromotive forces generated by the two windings, so that an electromotive force having a triangular waveform caused by periodic increase and decrease in the number of magnetic flux lines crossing one of the two windings and another electromotive force having a triangular waveform caused by associated periodic decrease and increase in the number of magnetic flux lines crossing the other one of the windings are synthesized so as to generate a periodic voltage having a rectangular waveform.

2. The induction generator having a pair of magnets of the same polarity opposed to each other with respect to a rotation shaft as claimed in claim 1, characterized in that:

said plurality of windings connected according to the predetermined configuration form first and second serial circuits;

said first serial circuit outputs a periodic first electromotive force having a rectangular waveform when a rotating magnetic field which causes electromagnetic induction in said even number of stator cores successively is created by said first, second, third and fourth magnets when said first and second single-opposed-polarity rotors are rotated; and said second serial circuit outputs a periodic second electromotive force of a rectangular waveform 180° out of phase with the first electromotive force and having the same period as the first electromotive force, when a rotating magnetic field which causes electromagnetic induction in said even number of stator cores successively is created by said first and second single-opposed-polarity rotors are rotated.

3. The induction generator having a pair of magnets of the same polarity opposed to each other with respect to a rotation shaft as claimed in claim 2, further comprising:

rotation position detecting means for detecting a position of said first and second single-opposed-polarity rotors during their rotation; and switching means which alternately causes positive components of said first electromotive force having a rectangular waveform and provided by said first serial circuit, or positive components of said second electromotive force having a rectangular waveform and provided by said second serial circuit to be output at intervals of an electrical angle of 180° to thereby produce a DC output.

4. The induction generator having a pair of magnets of the same polarity opposed to each other with respect to a rotation shaft as claimed in claim 1, characterized in that:

said plurality of windings comprise a first winding provided in a first stator core of said even number of stator cores, a second winding provided in a second stator core adjacent to the first stator core so as to wind in a direction opposite to a direction in which the first winding is provided, a third winding provided in a third stator core adjacent to the second stator core so as to wind in the same direction as the first winding, a fourth winding provided in a fourth stator core adjacent to the third stator core so as to wind in a direction opposite to a direction in which the third winding is provided, the first through fourth windings being connected with each other according to a predetermined configuration.

5. The induction generator having a pair of magnets of the same polarity opposed to each other with respect to a rotation shaft as claimed in claim 2, characterized in that:

said first serial circuit comprise a first winding provided to wind in a first direction in a first stator core of said even number of stator cores, a second winding serially connected to said first winding and provided in a second stator core adjacent to the first stator core so as to wind in a second direction opposite to the first direction, a third winding serially connected with said second winding and provided in a third stator core adjacent to the second stator core so as to wind in the first direction, a fourth winding serially connected to said third winding and provided in a fourth stator core adjacent to the third stator core so as to wind in the second direction; and said second serial circuit comprises a fifth winding provided to wind in the second direction in said first stator core, a sixth winding serially connected to said fifth winding and provided in said second stator core so as to wind in said first direction, a seventh winding serially connected with said sixth winding and provided in said third stator core so as to wind in said second direction, an eighth winding serially connected to said seventh winding and provided in said fourth stator core so as to wind in said first direction.

6. The induction generator having a pair of magnets of the same polarity opposed to each other with respect to a rotation shaft as claimed in claim 1, characterized in that:

said first through fourth magnets are arc-shaped; and said even number of stator cores have arc-shaped cross sections.

7. The induction generator having a pair of magnets of the same polarity opposed to each other with respect to a rotation shaft as claimed in claim 6, characterized in that said arc-shaped first through fourth magnets and said stator cores which have arc-shaped cross sections have an almost identical circumferential length.

8. The induction generator having a pair of magnets of the same polarity opposed to each other with respect to a rotation shaft as claimed in claim 2, characterized in that:

said first through fourth magnets are arc-shaped; and said even number of stator cores have arc-shaped cross sections.

9. The induction generator having a pair of magnets of the same polarity opposed to each other with respect to a rotation shaft as claimed in claim 3, characterized in that:

said first through fourth magnets are arc-shaped; and said even number of stator cores have arc-shaped cross sections.

10. The induction generator having a pair of magnets of the same polarity opposed to each other with respect to a rotation shaft as claimed in claim 4, characterized in that:

said first through fourth magnets are arc-shaped; and said even number of stator cores have arc-shaped cross sections.

11. The induction generator having a pair of magnetic poles of the same polarity opposed to each other with respect to a rotation shaft as claimed in claim 5, characterized in that:

said first through fourth magnets are arc-shaped; and said even number of stator cores have arc-shaped cross sections.

12. The induction generator having a pair of magnetic poles of the same polarity opposed to each other with respect to a rotation shaft as claimed in claim 8, characterized in that said arc-shaped first through fourth magnets and said stator cores which have arc-shaped cross sections have an almost identical circumferential length.

13. The induction generator having a pair of magnetic poles of the same polarity opposed to each other with respect to a rotation shaft as claimed in claim 9, characterized in that said arc-shaped first through fourth magnets and said stator cores which have arc-shaped cross sections have an almost identical circumferential length.

14. The induction generator having a pair of magnetic poles of the same polarity opposed to each other with respect to a rotation shaft as claimed in claim 10, characterized in that said arc-shaped first through fourth magnets and said stator cores which have arc-shaped cross sections have an almost identical circumferential length.

15. The induction generator having a pair of magnetic poles of the same polarity opposed to each other with respect to a rotation shaft as claimed in claim 11, characterized in that said arc-shaped first through fourth magnets and said stator cores which have arc-shaped cross sections have an almost identical circumferential length.

* * * * *

UNITED STATES PATENT AND TRADEMARK OFFICE
CERTIFICATE OF CORRECTION

PATENT NO. : 5,892,311
DATED : April 6, 1999
INVENTOR(S) : Hayasaka, Shigeaki

It is certified that error appears in the above-identified patent and that said Letters Patent is hereby corrected as shown below:

Title page, item [73] Assignee: delete the name of: Yazaki S.R.M. Company Ltd.

Signed and Sealed this

Fourth Day of April, 2000

*Attest:*

Q. TODD DICKINSON

*Attesting Officer*   *Director of Patents and Trademarks*